(12) United States Patent
Tao et al.

(10) Patent No.: US 10,560,027 B2
(45) Date of Patent: *Feb. 11, 2020

(54) SEMICONDUCTOR DEVICE AND METHOD THEREFOR

(71) Applicant: FAIRCHILD SEMICONDUCTOR CORPORATION, Phoenix, AZ (US)

(72) Inventors: Zhibo Tao, Palo Alto, CA (US); Chih-Hsien Hsieh, Changhua County (TW); Yue-Hong Tang, Nantou County (TW)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,814

(22) Filed: Feb. 4, 2019

(65) Prior Publication Data

US 2019/0181763 A1 Jun. 13, 2019

Related U.S. Application Data

(63) Continuation of application No. 15/472,802, filed on Mar. 29, 2017, now Pat. No. 10,236,779.

(60) Provisional application No. 62/324,517, filed on Apr. 19, 2016.

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33592* (2013.01); *H02M 3/33523* (2013.01); *H02M 2001/0009* (2013.01); *Y02B 70/1475* (2013.01)

(58) Field of Classification Search
CPC ......... H02M 3/33507; H02M 3/33523; H02M 3/33592
See application file for complete search history.

(56) References Cited

U.S. PATENT DOCUMENTS

| 7,986,536 | B2 | 7/2011 | Lhermite |
| 10,236,779 | B2 * | 3/2019 | Tao ................... H02M 3/33592 |
| 2005/0073862 | A1 | 4/2005 | Mednik et al. |
| 2008/0037294 | A1 | 2/2008 | Indika de Silva et al. |
| 2013/0148387 | A1 | 6/2013 | Ren et al. |
| 2014/0112030 | A1 | 4/2014 | Fahlenkamp |
| 2014/0252981 | A1 | 9/2014 | Xi et al. |
| 2014/0268923 | A1 | 9/2014 | Valley |
| 2015/0162843 | A1 | 6/2015 | Chen et al. |
| 2015/0311810 | A1 | 10/2015 | Chen et al. |
| 2015/0349652 | A1 | 12/2015 | Lefedjiev et al. |

(Continued)

*Primary Examiner* — Fred E Finch, III
(74) *Attorney, Agent, or Firm* — Robert F. Hightower

(57) ABSTRACT

In one embodiment, a power supply controller, or alternately a semiconductor device having a power supply controller, may have a first circuit configured to form a sense signal that is representative of a signal from an auxiliary winding of a transformer. A feedback circuit may be configured to allow the sense signal to increase in response to a turn-off of the power switch, to subsequently detect a second increase of the sense signal prior to subsequently turning on the power switch, and to form a feedback signal as a value of the sense signal responsively to the second increase of the sense signal.

20 Claims, 8 Drawing Sheets

(56) References Cited

U.S. PATENT DOCUMENTS

2016/0182131 A1 6/2016 Mednik et al.
2016/0373011 A1 12/2016 Kawashima
2017/0214326 A1 7/2017 Hu et al.
2017/0288553 A1 10/2017 Fahlenkamp et al.

* cited by examiner

SEMICONDUCTOR DEVICE AND METHOD THEREFOR

PRIORITY CLAIM TO PRIOR FILING

The present application is a continuation application of prior U.S. application Ser. No. 15/472,802, filed on Mar. 29, 2017, which is hereby incorporated herein by reference, and priority thereto for common subject matter is hereby claimed. This application also claims priority to prior filed Provisional Application No. 62/324,517 entitled "Adaptive Sampling For Primary Side Regulation Of A Synchronous Rectifier" filed on Apr. 19, 2016, and having common inventors Zhibo Tao et al. all of which are hereby incorporated herein by reference.

BACKGROUND OF THE INVENTION

The present invention relates, in general, to electronics, and more particularly, to semiconductors, structures thereof, and methods of forming semiconductor devices.

In the past, the electronics industry utilized various methods and structures to form power supply systems used to regulate an output voltage to a desired value. In some applications, the power supply included a transformer with a primary and secondary side. The system may have utilized a primary side controller on the primary side of the transformer and may have also included a synchronous rectifier (SR) on the secondary side in order to improve efficiency.

For those applications that used a synchronous rectifier (SR) it was desirable to for the primary side controller to have an estimate of the output voltage. Otherwise, the primary side may have been incorrectly controlled which could result in improper regulation of the output voltage.

Accordingly, it is desirable to have a power supply control circuit that improves regulation of the output voltage, and/or that improves the estimation of the output voltage.

Figure 1:
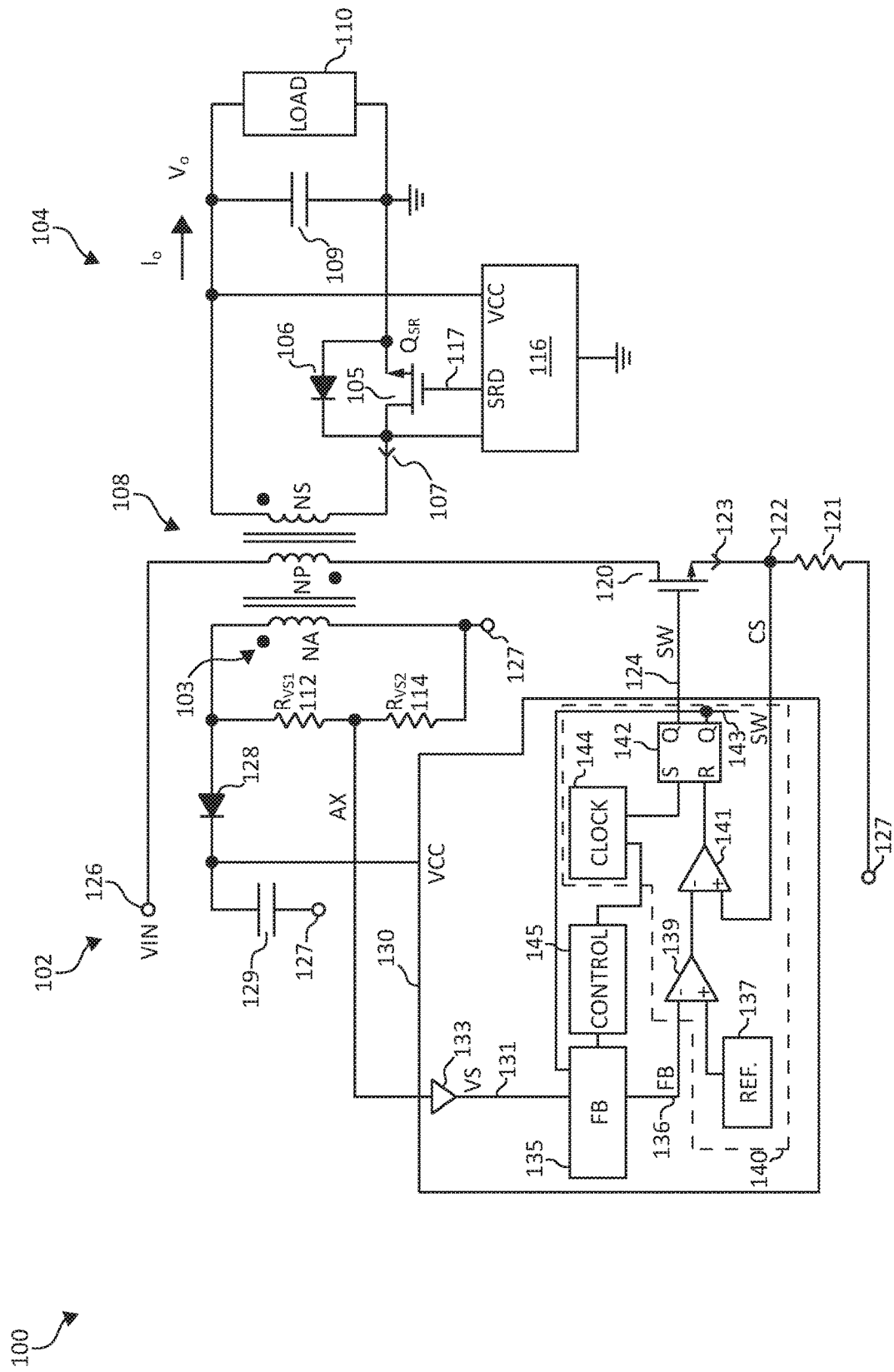
FIG. 1 schematically illustrates an example of an embodiment of a portion of a power supply system in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted"

means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Except as otherwise noted herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter suitably may have embodiments and/or may be practiced in the absence of any element which is not specifically disclosed herein.

DETAILED DESCRIPTION OF THE DRAWINGS

FIG. 1 schematically illustrates a portion of an example of an embodiment of a power supply system 100 that regulates an output voltage (Vo) to a desired value. System 100 includes a transformer 108 that has a primary winding (NP), a secondary winding (NS), and an auxiliary winding (NA) 103. A primary side 102 of system 100 is connected to the primary winding of transformer 108. A secondary side 104 of system 100 is configured to form the output voltage (Vo) from the secondary winding. Secondary side 104 may include a synchronous rectifier (illustrated as a transistor 105), an output capacitor 109, and a synchronous rectifier control circuit, or controller 116. Some embodiments of transistor 105 may include a body diode 106. Other embodiments may use a diode instead of transistor 105 as the synchronous rectifier. In an embodiment, circuit 116 may be configured to control transistor 105 in response to signals received from secondary side 104. In other embodiments, circuit 116 may also receive signals from primary side 102.

Primary side 102 receives an input voltage (Vin) between a voltage input 126 and a common return terminal 127. A primary side power switch, illustrated as a transistor 120, may be connected to the primary winding in order to control a primary side current 123 that flows through the primary winding and transistor 120. An optional current sense circuit, illustrated as a resistor 121, may be configured to form a current sense (CS) signal 122 that is representative of the value of current 123. Those skilled in the art will appreciate that the current sense circuit may have other embodiments such as for example a sense transistor or other element that forms a current sense signal that is representative of current 123. For example, transistor 120 may be a SENSEFET transistor that forms a signal representative of current 123. A power supply control circuit 130 may be configured to receive signal 122 and form a switching drive (SW) signal 124 to control transistor 120. In some embodiments, transistor 120 may be included within a portion of circuit 130.

In an embodiment, auxiliary winding 103 may be utilized to form an operating voltage for operating circuitry on primary side 102. For example, a diode 128 and a capacitor 129 may be connected to the auxiliary winding to form an operating voltage (Vcc) for operating circuit 130. Auxiliary winding 103 may also be used to form an auxiliary (AX) signal that may be used by circuit 130. In some embodiments an optional resistor divider, such as for example resistors 112 and 114, or other circuitry may be utilized to reduce the value of the AX signal formed by auxiliary winding 103 to a value that can be used by circuit 130.

As will be seen further hereinafter, an embodiment of circuit 130 may be configured to receive the auxiliary (AX) signal and form a voltage sample (VS) signal 131 that is representative of the value of the output voltage (Vo). An embodiment may include that circuit 130 may be configured to use signal 131 to form a feedback (FB) signal that is representative of the output voltage (Vo). Some embodiments of circuit 130 may be configured to use the feedback (FB) signal to assist in controlling the power switch and current 123 in order to regulate the value of the output voltage (Vo) to a desired value. Those skilled in the art will appreciate that the output voltage is regulated to the desired value within a range of values around the desired value. For example, the desired value may be five volts (5 v) and the range of values may be plus or minus five percent (5%) around the five volts.

Circuit 130 may include an optional buffer circuit 133 or other type of circuit that receives the auxiliary (AX) signal and forms sense signal 131. A feedback (FB) circuit 135 of circuit 130 may be configured to receive signal 131 and form a feedback (FB) signal 136 that represents the value of the output voltage (Vo). In some embodiments, circuit 135 may also be referred to as a VS sampling circuit. A switching control circuit 140, such as for example a PWM or PFM circuit, may be configured to receive signals 122 and 136 and control current 123 to regulate the output voltage (Vo) to the desired value. Circuit 140 may include a clock generation circuit or clock circuit 144 that may be configured to form one or more clock signals to assist in the operation of circuit 130. An embodiment of circuit 140 may also include a reference generation circuit or Ref circuit 137, an error amplifier circuit or amplifier 139, a comparator 141, and a switching control latch 142. Circuit 130 may also include a logic and/or control circuit 145 that may assist in forming clock or timing signals to assist in the operation of circuit 135 and/or circuit 140.

Figure 2:
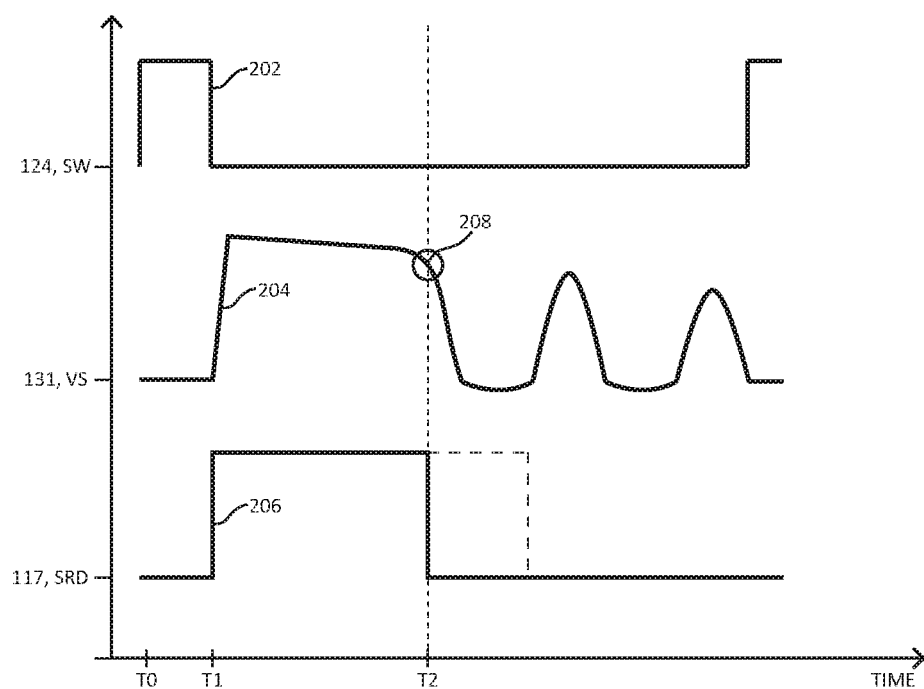
FIG. 2 is a graph having plots that illustrate some signals that may occur during an example of an operation of an embodiment of a circuit of the system of FIG. 1 in accordance with the present invention.

FIG. 2 is a graph having plots that illustrate in a general manner examples of some signals that may occur during an example of an operation of an embodiment of circuit 130 or alternately system 100. The abscissa indicates time and the ordinate indicates increasing value of the illustrated signal. A plot 202 illustrates an example of signal 124, a plot 204 illustrates an example of signal 131, and a plot 206 illustrates an example of SRD signal 117 to transistor 105. This description has references to FIG. 1 and FIG. 2.

For this example, assume that at a time T0 signal 124 is asserted thereby enabling transistor 120, and current 123 is flowing through the primary winding and transistor 120, thus, storing energy in transformer 108. The AX signal and signal 131 are substantially zero. Additionally, transistor 105 is disabled. At a time T1, transistor 120 is disabled causing a transfer of energy into the secondary winding and auxiliary winding of transformer 108. Secondary controller 116 detects a voltage across the secondary winding and enables transistor 105 as illustrated by plot 206. Additionally, the disabling transistor 120 also causes signal 131 to increase as illustrated by plot 204. Those skilled in the art will appreciate the value of signal 131 is different from the value of the output voltage (Vo) by the value of the voltage drop across transistor 105, the difference in the turns ratio between the windings, the voltage drop of the resistor divider formed by resistors 112 and 114, and any signal lost by optional buffer 133. However, signal 131 may be representative of the output voltage (Vo). Assume that at a time T2 current 107 become substantially zero which causes the value of the voltage across the secondary winding, and across the AX winding, to decrease as illustrated at a point 208. Additionally, controller 116 may disable transistor 105 at substantially the zero crossing of current 107 as illustrated by plot 206. The dashed lines of plot 206 indicate that controller 116 may alternately disable transistor 105 after the substantially zero crossing of current 107. At the substantially zero crossing of current 107, the value of signal 131 is representative of the value of the output voltage (Vo). Thus, the value of signal 131 can be used as a feedback signal to represent the value of the output voltage. In an embodiment, the value of signal 131 may be representative of the value of the output voltage during a time interval that both transistor 120 is disabled and transistor 105 is enabled.

Figure 3:
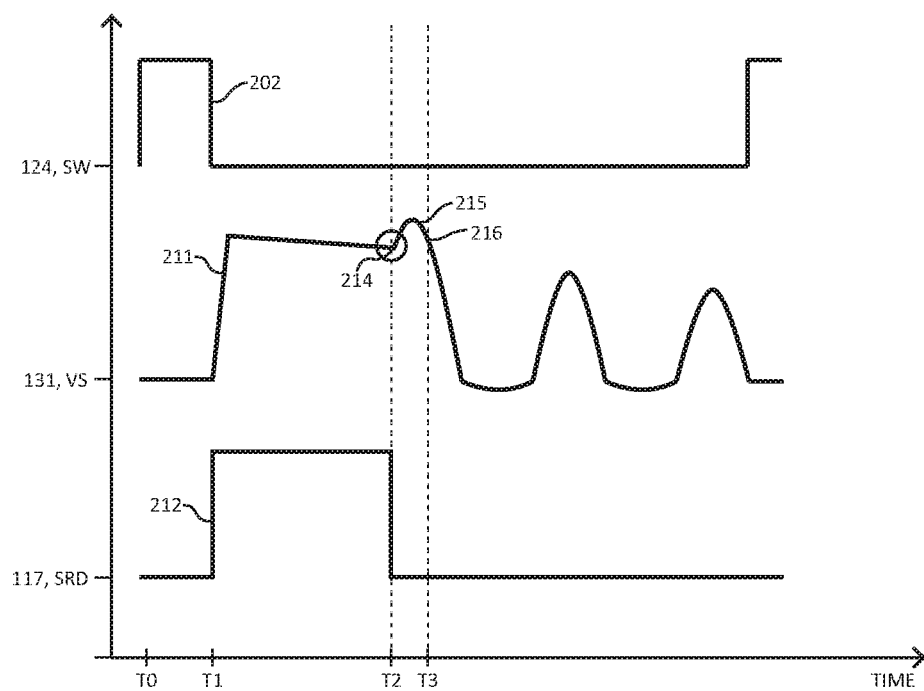
FIG. 3 is a graph having plots that illustrate some signals that may occur during another example of an operation of an embodiment of a circuit of the system of FIG. 1 in accordance with the present invention.

FIG. 3 is a graph having plots that illustrate in a general manner examples of some signals that may occur during another example of an operation of an embodiment of circuit 130 or alternately system 100. The abscissa indicates time and the ordinate indicates increasing value of the illustrated signal. Plot 202 again illustrates an example of signal 124. A plot 211 illustrates an example of another embodiment of signal 131 and a plot 212 illustrates another example of an embodiment of SRD signal 117 that enables and disables transistor 105.

For this example, assume that at a time T0 signal 124 is asserted enabling transistor 120 and current 123 is flowing through the primary winding and transistor 120 storing energy in transformer 108. Thus, the AX signal and signal 131 are substantially zero. Additionally, transistor 105 is disabled. At a time T1, transistor 120 is disabled causing a transfer of energy into the secondary winding and auxiliary winding 103. Secondary controller 116 detects a voltage across the secondary winding and enables transistor 105 as illustrated by plot 212. Additionally, disabling transistor 120 also causes signal 131 to increase as illustrated by plot 211.

Assume that at a time T2 controller 116 disables transistor 105 but current 107 through transistor 105 is not yet zero. As illustrated by plot 211 at point 214, the value of signal 131 begins to increase because the secondary winding is still discharging the stored energy. Thus, the value of signal 131 will increase to a peak 215 and then resonate as illustrated between times T2 and T3 and points 215 and 216. However, between times T1 and T2 the value of signal 131 is still representative of the value of the output voltage. After the increase in the value of signal 131 at point 215 signal 131 begins to decrease toward a lower value.

Figure 4:
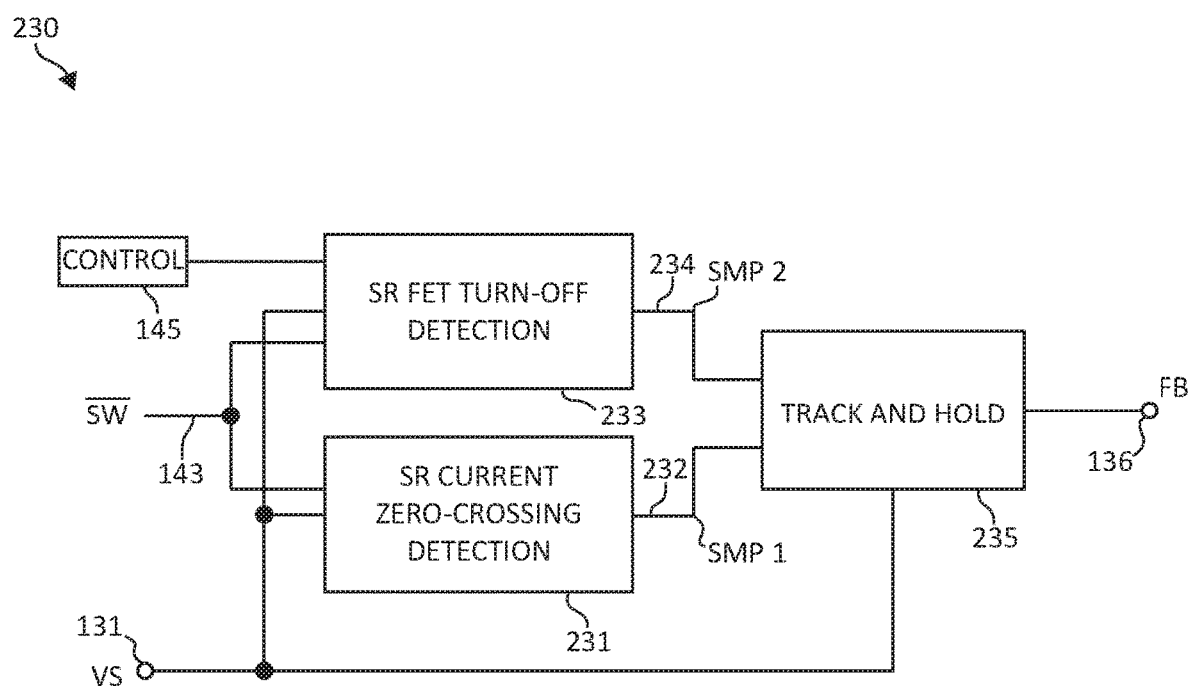
FIG. 4 schematically illustrates a portion of an example of an embodiment of a feedback circuit that may be an alternate embodiment of a circuit of the system of FIG. 1 in accordance with the present invention.

FIG. 4 schematically illustrates a portion of an example of an embodiment of a feedback circuit 230 that may be an alternate embodiment of circuit 135 (FIG. 1). As will be seen further hereinafter, an embodiment of circuit 230 may be configured to form feedback signal 136 as a value of signal 131 during a time interval after transistor 120 is disabled. An embodiment of circuit 230 may be configured to allow signal 131 to increase to in value, such as for example to a first value, in response to negating signal 124 (or alternately responsively to disabling transistor 120); to subsequently detect signal 131 increasing in value, such as for example increasing to a second value, during at least a portion of the time interval that signal 124 is negated (or alternately a portion of the time interval that transistor 120 is disabled); and to form signal 136 as a value of signal 131 in response to detecting the increase in signal 131, such as for example the increase to the second value that is greater than the first value. Alternately, circuit 230 may be configured to form signal 136 as a value of signal 131 in response to detecting that the secondary rectifier has turned off prior to a zero crossing of the secondary current. In an embodiment, circuit 230 may be configured to store a value of signal 131 in response to detecting that the secondary rectifier has turned off prior to a zero crossing of the secondary current. Those skilled in the art will appreciate that the value of signal 131 may be stored at any time prior to detecting the secondary rectifier has turned off prior to the zero crossing but an embodiment may have more accurate results by storing the value substantially simultaneously with storing the value in response to the detecting.

A detection circuit 233 of circuit 230 may have an embodiment that may be configured to detect the disabling of transistor 105 prior to the substantially zero crossing of current 107. Circuit 233 may have an embodiment that may be configured to detect that transistor 105 is disabled prior to the value of current 107 becoming substantially zero. For example, circuit 233 may be configured to detect the disabling of transistor 105 prior to the substantially zero crossing of current 107 based on the value of signal 131. In an embodiment, circuit 233 may be configured to allow signal 131 to increase to a first value in response to negating signal 124 (or alternately responsively to disabling transistor 120); and to subsequently detect signal 131 again increasing in value, such as for example increasing to a second value, during at least a portion of the time interval that signal 124 is negated or alternately remains negated, (or alternately a portion of the time interval that transistor 120 is disabled). Circuit 233 may also be configured to assert an SMP2 detection signal 234 indicating that circuit 233 has detected the disabling of transistor 105 prior to current 107 becoming substantially zero or alternately indicating that signal 131 has increased to the second value during the time interval that signal 124 is negated. An embodiment of circuit 233 may be configured to detect that signal 131 increases in value at a time interval after transistor 120 is disabled and assert signal 234 in response to the detection. For example, circuit 233 may be configured to allow signal 131 to increase in response to disabling transistor 120, then detect a subsequent increase in signal 131 during the interval that signal 124 is negated (or the interval that transistor 120 is disabled) and before signal 124 is again asserted (or that transistor 120 is subsequently re-enabled). Circuit 233 may assert signal 234 in response to the detection. Circuit 233 detecting the increase of signal 131 more accurately detects that transistor 105 is disabled prior to the substantially zero crossing of the current which improves the regulation of the output voltage.

Circuit 230 may also include another detection circuit 231 that may be configured to detect disabling transistor 105 no earlier than the substantially zero crossing of current 107. An embodiment of circuit 231 may be configured to detect, using signal 131, that transistor 105 is disabled at the substantially zero crossing of current 107 or alternately no earlier than the substantially zero crossing of current 107. An embodiment of circuit 231 may be configured to detect that signal 131 decreases in value at a time interval after transistor 120 is disabled. For example, circuit 231 may be configured to allow signal 131 to increase in response to negating signal 124 (or alternately in response to disabling transistor 120), then detect a subsequent decrease in signal 131 during the interval that signal 124 is negated (or alternately the time interval that transistor 120 is disabled) or before transistor 120 is subsequently re-enabled. Circuit 231 may have an embodiment that may be configured to assert an SMP1 detection signal 232 indicating that circuit 231 has detected the decrease of signal 131, or alternately indicating the substantially zero crossing of current 107 prior to or substantially at or no earlier than the disabling of transistor 105.

Circuit 230 may also include a sample and hold or track and hold circuit 235 that may have an embodiment that may be configured to form feedback signal 136 that is representative of the value of the output voltage. An embodiment of circuit 235 may be configured to form the feedback signal by storing a value of signal 131 in response to detecting that transistor 105 is disabled prior to current 107 becoming substantially zero or in response to detecting current 107 becoming substantially zero no later than the disabling of transistor 105. Alternately, circuit 235 may be configured to form signal 136 by storing a value of signal 131 in response to detecting the subsequent increase in signal 131 during the interval that signal 124 is negated, or in response to detecting the subsequent decrease in signal 131 during the interval that signal 124 is negated.

Figure 5:
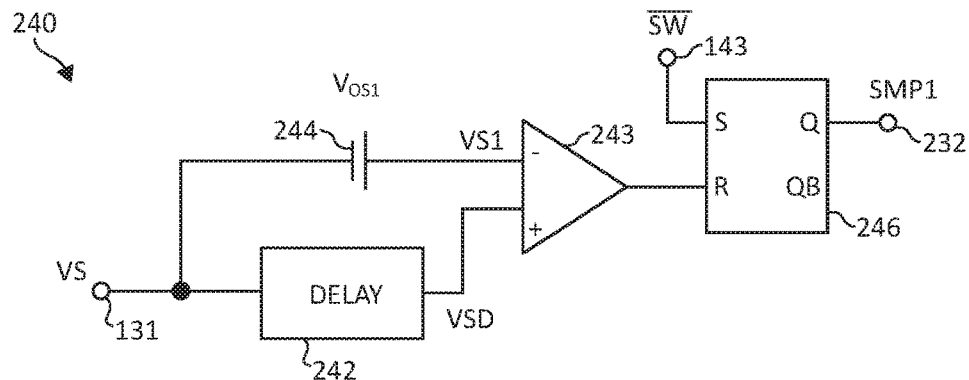
FIG. 5 schematically illustrates an example of a portion of an embodiment of a detection circuit that may be an alternate embodiment of the circuit of FIG. 4 in accordance with the present invention.

FIG. 5 schematically illustrates a portion of an example of a portion of an embodiment of a detection circuit 240 that may be an alternate embodiment of circuit 231 (FIG. 4). An embodiment of circuit 240 may be configured to detect a decrease of signal 131 after transistor 120 is disabled. Another embodiment of circuit 240 may be configured to detect a decrease of signal 131 after transistor 120 is disabled and prior to a time in which transistor 120 is subsequently enabled or alternately during an interval during which signal 124 remains negated. Circuit 240 may include an embodiment that allows signal 131 to increase in response to negating signal 124 (or alternately in response to disabling transistor 120) and to detect a decrease of signal 131 during a time interval that signal 124 remains negated. Circuit 240 may also have an embodiment configured to assert signal 232 in response to the detection.

Circuit 240 may include a delay circuit 242 that receives signal 131 and forms a delayed VS (VSD) signal. Circuit 240 may also include a comparator 243, an offset circuit 244, and a storage element, such as a latch 246. Offset circuit 244 adds a small voltage to signal 131 to form the offset VS (VS1) signal. In some embodiments the value of the offset is less than five hundred millivolts (500 mV), other embodiment may include the offset to be ten or twenty millivolts (10 mV or 20 mV) or alternately a value therebetween. Delay circuit 242 may have an embodiment that is configured to receive signal 131 and delay signal 131 for a time interval to form the VSD signal. Circuit 242 may be an analog circuit or may be a digital circuit such as a digital circuit that samples signal 131 and reproduces it delayed in time by a delay time interval. An embodiment may include that the amount of the delay formed by circuit 242 is less than a minimum off-time for signal 124 (FIG. 1). For example, the delay may be less than ten to twenty percent (10% to 20%) of the minimum off-time of signal 124. In other embodiments the delay may be a percent of the duty cycle of signal 124.

Figure 6:
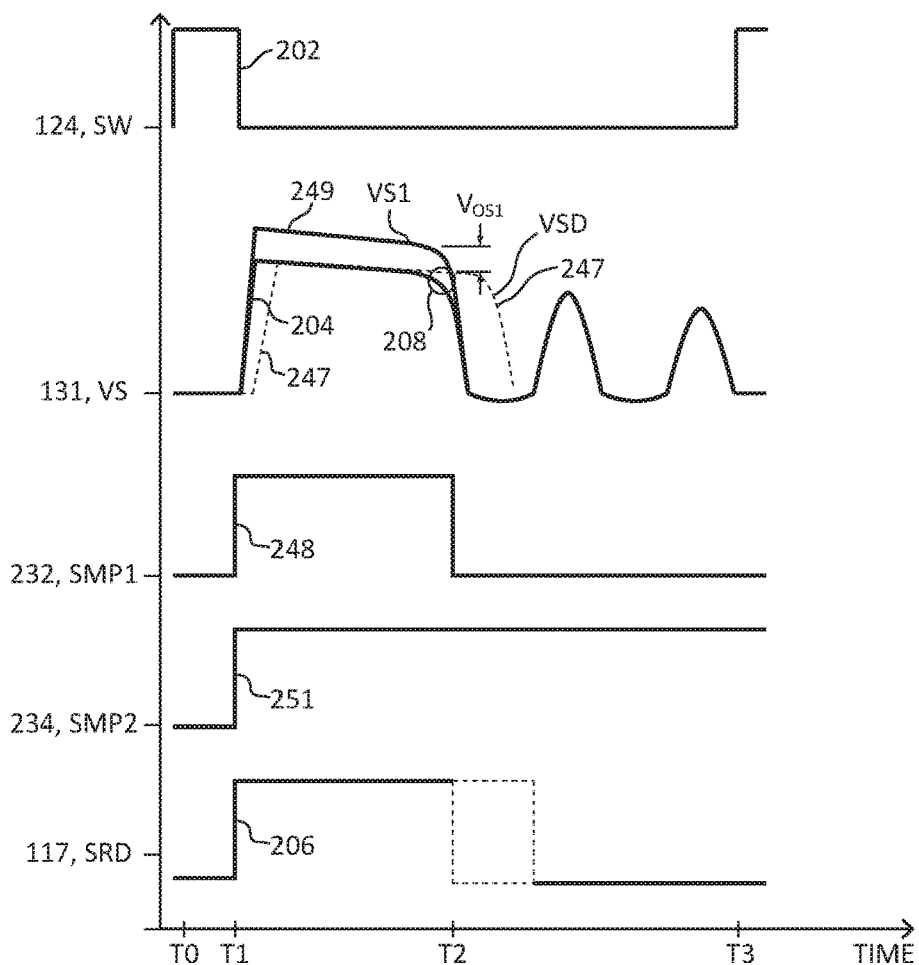
FIG. 6 is a graph having plots that illustrate examples of some signals that may be formed by an operation of an embodiment of the circuit of FIG. 5 in accordance with the present invention.

FIG. 6 is a graph having plots that illustrate in a general manner examples of some signals that may be formed by an operation of an embodiment of circuit 240. The abscissa indicates time and the ordinate indicates increasing value of the illustrated signals. Plots 202, 204, and 206 are substantially the same as the corresponding plots of FIG. 2. A plot 247 illustrates, in dashed lines, the delayed VS (VSD) signal, and a plot 249 illustrates the offset VS (VS1) signal. A plot 248 illustrates SMP1 detection signal 232, and a plot 251 illustrates some values of signal 232. This description has references to FIG. 5 and FIG. 6. Note that a high voltage level of signals 232 and 234 is a negated state and a low voltage level is an asserted state.

At a time T1, signal 124 becomes negated which results in setting latch 246 and forcing signal 232 high thereby negating signal 232.

Signal 131 increases in value in response to the disabling of transistor 120 (FIG. 1) as illustrated by plot 204. The offset VS (VS1) signal follows the increase of signal 131 and increases at time T1 as illustrated by plot 249. Because signal VS1 is greater than signal VSD, the output of comparator 243 is forced low. The delayed VS (VSD) signal does not begin increasing until after the delay as illustrated by plot 247, thus, the output of comparator 243 remains low. At time T2 transistor 105 (FIG. 1) may be disabled substantially at or near to or at least no earlier than the zero crossing of current 107 as illustrated by plot 206. Thus, signal 131 begins to decrease thereby causing the VS1 signal to decrease to a value that is less than the value of the delayed VS (VSD) signal. Therefore the output of comparator 243 is forced high which resets latch 246 and forces signal 232 low, therefore asserting signal 232. Thus, an embodiment of circuit 240 may be configured such that as long as VS1>VSD the output of comparator 243 is low, thus, as long as transistor 120 is disabled, signal 232 is negated. An embodiment may also include that the condition of VS1<VSD or VS1=VSD represents an inflection point of VSD decreasing rapidly in response to disabling transistor 105 at or near the substantially zero crossing of current 107 (or alternately not before the zero crossing of current 107), thereby forcing the output of comparator 243 high and resetting latch 246 and asserting signal 232. An embodiment may include that the high to low transition of signal 232 represents the detection of the decrease in value of signal 131.

Figure 7:
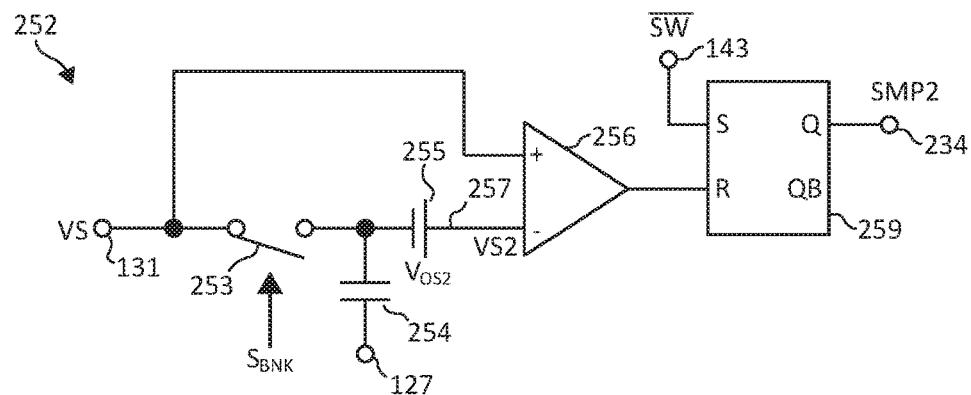
FIG. 7 schematically illustrates a portion of an example of an embodiment of another detection circuit that may be an alternate embodiment of the circuit of FIG. 4 in accordance with the present invention.

FIG. 7 schematically illustrates a portion of an example of an embodiment of a detection circuit 252 that may be an alternate embodiment of circuit 233 (FIG. 4). An embodiment of circuit 252 may be configured to detect that transistor 105 is disabled prior to current 107 becoming substantially zero. Circuit 252 may have an embodiment that may be configured to detect a second increase of signal 131 subsequently to negating signal 124 (or alternately disabling transistor 120). Circuit 252 may include a coupling switch 253, a storage element, such as for example a capacitor 254, an offset circuit 255, a comparator 256, and another storage element, such as for example a latch 259. An embodiment of circuit 252 may be configured to store a value of signal 131 in response to negating signal 124 (or alternately disabling transistor 120) and to thereafter detect the value of signal 131 increasing to a value that is greater than the stored value. An embodiment of circuit 252 may also be configured to delay a time interval after negating signal 124 and after expiration of the delay time interval detect an increase of signal 131 during the interval that signal 124 is negated (or alternately that transistor 120 is disabled), thus, prior to a subsequent enabling of transistor 120. An embodiment of circuit 252 may be configured to delay a first time interval after negating signal 124 (or disabling transistor 120) and thereafter detect an increase in the value of signal 131, an embodiment may include that the detecting of the increase in signal 131 may be prior to a subsequent enabling of transistor 120.

Figure 8:
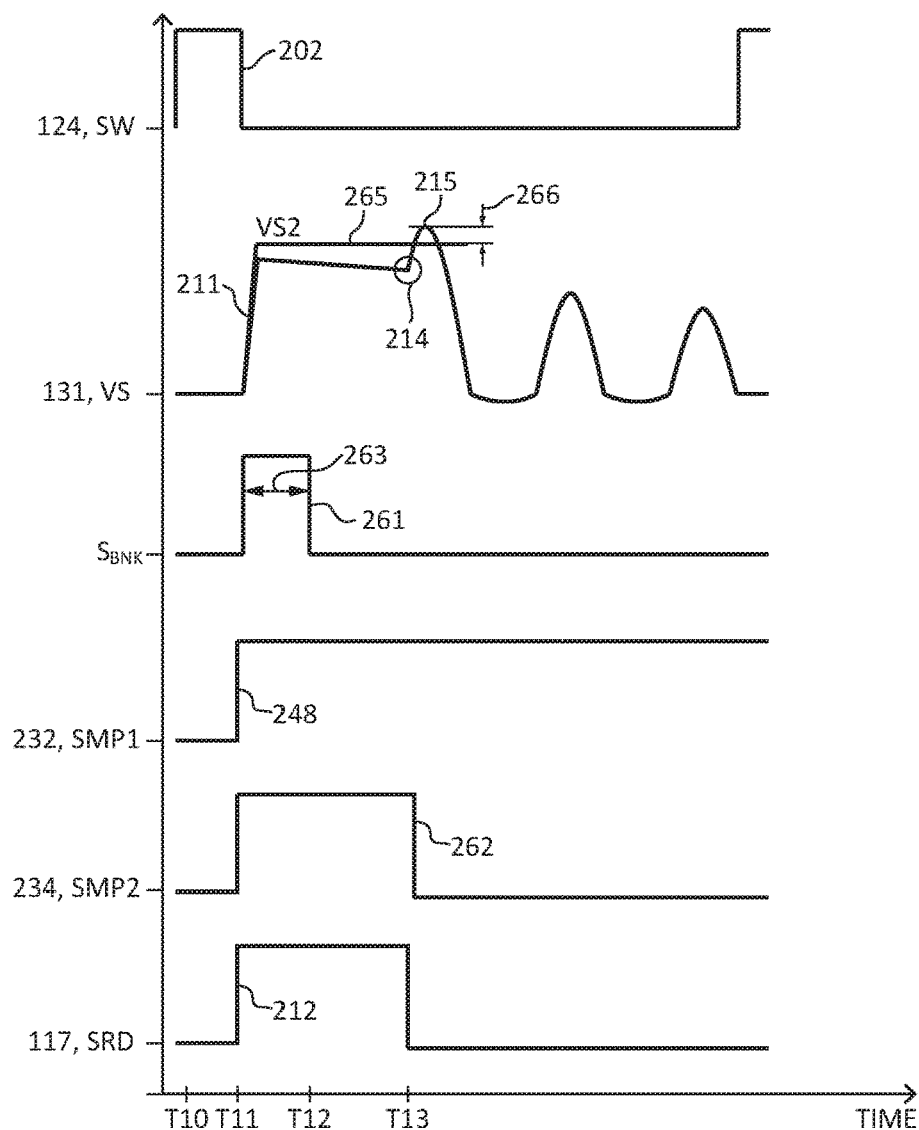
FIG. 8 is a graph having plots that illustrate examples of some signals that may be formed during operation of an example of an embodiment of the circuit of FIG. 7 in accordance with the present invention.

FIG. 8 is a graph having plots that illustrate in a general manner examples of some signals that may be formed during operation of an example of an embodiment of circuit 252. The abscissa indicates time and the ordinate indicates increasing value of the illustrated signals. Plots 202, 211, and 212 are substantially similar to the corresponding plots of FIG. 3. A plot 261 illustrates an example of an embodiment of a control signal (Sbnk) used to control switch 253, and a plot 262 illustrates an embodiment of signal 234. A plot 265 illustrates an offset signal 257 as will be seen further hereinafter. Note that a high voltage level of signals 232 and 234 represents a negated state and a low voltage level represents an asserted state. This description has references to FIG. 7 and FIG. 8.

At time T10 signal 124 is asserted and transistor 120 is enabled. Assume that at a time T11 signal 124 is negated and transistor 120 is disabled. The negating of signal 124 forces signal 143 high which sets latch 259 and forces signal 234 to a high level, thus, negating signal 234. As explained hereinbefore, signal 131 goes high in response to disabling transistor 120 as illustrated by plot 211. Also, the Sbnk signal may be asserted in response to negating signal 124 thereby closing switch 253 and storing the value of signal 131 on capacitor 254. The Sbnk signal remains asserted for a time interval 263 to ensure that the value of signal 131 is stored, and subsequently becomes negated at a time T12. Time interval 263 may have an embodiment that is smaller than a minimum off-time of transistor 120. An offset (Vos2) 255 is added to the stored value to form an offset VS (VS2) signal 257. In some embodiments the value of the offset formed by circuit 255 is less than five hundred millivolts (0.5 V), other embodiment may include the offset to be ten or twenty millivolts (10 mv or 20 mv) or alternately a value therebetween. Comparator 256 receives signal 131 and signal 257. Because signal 257 is greater than signal 131, as illustrated by plots 211 and 265, the output of comparator 256 is low and has no effect on latch 259, thus, signal 234 remains high as the negated state. At time T12, the time interval expires and switch 253 is opened or disabled thereby saving the value of signal 131 on capacitor 254. Subsequently, at time T13 SR transistor 105 is disabled prior to the value of current 107 being zero. Therefore, the value of signal 131 increases as is illustrated by plot 211 between points 214 and 215. The value of signal 131 increases beyond the value of signal VS2, as illustrated by the signal difference 266. As the value of signal 131 reached the value of VS2 it causes the output of comparator 256 to go high and reset latch 259, thereby forcing signal 234 low as the asserted state. In an embodiment, the high value to low value transition of signal 234 may be representative of circuit 252 detecting that SR transistor 105 is disabled prior to current 107 becoming substantially zero. Alternately the high value to low value transition of signal 234 may be representative of circuit 252 detecting that signal 131 had another increase in value, in addition to the initial increase that occurs in response to disabling transistor 120, that occurs during at least a portion of the time interval that signal 124 is negated or alternately the time that transistor 120 is disabled or alternately prior to transistor 120 being enabled again.

Figure 9:
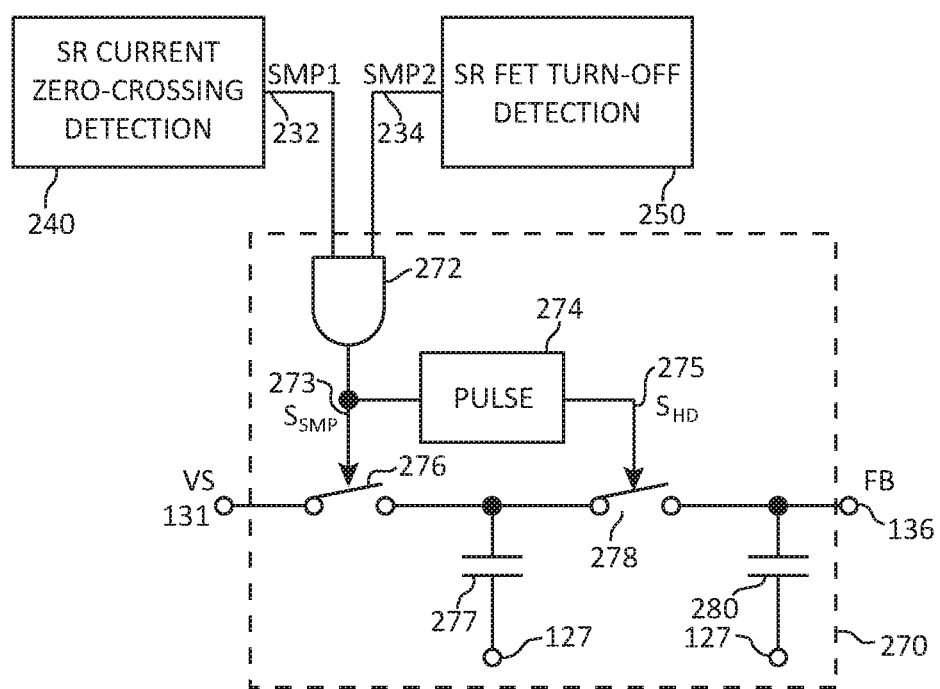
FIG. 9 schematically illustrates a portion of an example of an embodiment of a feedback circuit that may be an alternate embodiment of a circuit of FIG. 4 in accordance with the present invention.

FIG. 9 schematically illustrates a portion of an example of an embodiment of a feedback circuit 270 that may be an alternate embodiment of circuit 235 (FIG. 4). An embodiment of circuit 270 may be configured to form feedback signal 136 that is representative of the value of the output voltage. Circuit 270 may have an embodiment that may be configured to store signal 131 responsively to circuit 130 or alternately circuit 252 detecting an increase of signal 131 during a time interval that signal 124 is negated, or alternately responsively to circuit 130 or alternately circuit 240 detecting a decrease of signal 131 during a time interval that signal 124 is negated.

Circuit 270 may have an embodiment that may be configured to store a value of signal 131 on a storage element in response to detecting either the early turnoff-off of transistor 105 prior to current 107 becoming substantially zero or alternately in response to detecting a substantially zero crossing of current 107 either prior to or substantially concurrently with disabling transistor 105. Circuit 270 may also be configured to save the stored value of signal 131 for subsequent use as signal 136.

Circuit 270 may have an embodiment that may include an AND gate 272, a pulse generation circuit 274, a switch 276, a switch 278, a capacitor 277, and a capacitor 280. Gate 272 is configured to receive signals 232 and 234 and to assert an output (Ssmp) signal 273 in response to an asserted state of either of signals 232 or 234 (the asserted state of signals 232 and 234 is a low logic level). Circuit 274 is configured to form a pulse (Shd) signal 275 responsively to detecting the transition from the asserted to the negated state of signal 273.

Figure 10:
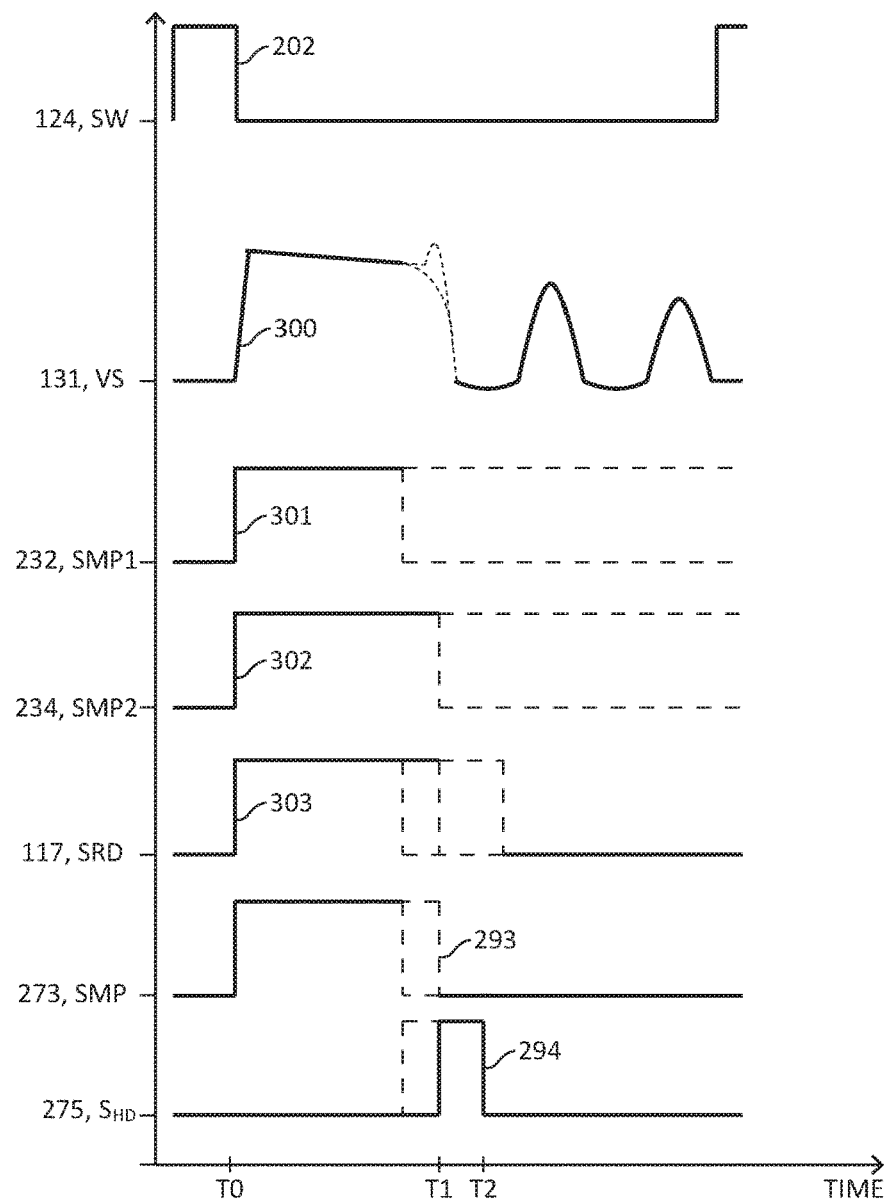
FIG. 10 is a graph having plots illustrating some of the signals formed during the operation of an example of an embodiment of the circuit of FIG. 9 in accordance with the present invention.

FIG. 10 is a graph having plots illustrating in a general manner examples some of the signals formed during the operation of an example of an embodiment of circuit 270. The abscissa indicates time and the ordinate indicates increasing value of the illustrated signals. Plot 202 is the same as is explained hereinbefore. A plot 300 illustrates in a generalized manner signal 131 and in dashed lines the various conditions of signal 131 as explained hereinbefore. Plots 301 and 302 illustrate possible states of respective signals 232 and 234 where the dashed lines illustrate possible conditions for the respective signals. A plot 303 illustrates SRD signal 117 and the dashed portions indicate possible conditions of signal 117. A plot 293 illustrates signal 273 and a plot 294 illustrates signal 275.

Assume that prior to a time T0 signal 124 was asserted and is negated at time T0. Prior to time T0, signal 131 and signals 232 and 234 are a low voltage level. At time T0 signal 131 increases in response to negating signal 124 and disabling transistor 120 thereby causing signals 232 and 234 to also increase (become negated). Since both of signals 232 and 234 are high, signal 273 also is driven high to be asserted. Asserting signal 273 closes or enables switch 276 to connect signal 131 to capacitor 277 thereby storing the value of signal 131 on capacitor 277. Signal 275 remains negated, thus, switch 278 is disabled or open.

Subsequently, at a time T1 signal 131 changes as explained hereinbefore. Signal 131 either decreases or increases depending on the operation as explained hereinbefore as illustrated by the dashed lines. Consequently one of signals 232 or 234 will become a low level or asserted as illustrated by the dashed lines of plots 301 and 302. The condition of signal 232 becoming asserted (becoming a low value) before signal 234 is an indication that transistor 105 is disabled either at substantially the zero crossing of current 107 or disabled after the zero crossing. The condition of signal 234 being negated (becoming a low value) prior to signal 232 indicates that transistor 105 was turned off early or prior to the substantially zero crossing of current 107. The low level from one of signals 232 or 234 forces signal 273 low, as illustrated by plot 293, which opens switch 276 thereby saving the value of signal 131 on capacitor 277. The asserted to negated transition of signal 273 is detected by circuit 274 which briefly asserts signal 275 thereby closing switch 278 and transferring the value of signal 131 onto capacitor 280. The duration of signal 275 is sufficient to transfer the stored value on capacitor 277 to capacitor 280. At a time T2 signal 275 is negated thereby opening switch 278. Circuit 270 holds the stored value of signal 131 as signal 136 that is representative of the value of the output voltage (Vo).

In an embodiment, circuit 274 may be a one-shot circuit configured to form a pulse in response to a falling edge of signal 273.

In other embodiments, circuit 270 may use other techniques to store the value, for example circuit 270 may include an analog-to-digital converter that may form a digital value representing the value of signal 131 and may store the digital value. Circuit 270 may have an embodiment that is part of a digital signal processor or other circuitry that includes an analog-to-digital converter.

Referring back to FIG. 1, signal 136 may be used as a feedback signal that is representative of the value of the output voltage (Vo), and may be used to adjust the duty cycle of signal 124 to regulate the output voltage (Vo) to the desired value. Those skilled in the art will appreciate that by forming signal 136 from signal 131, system 100 does not have to receive signals from secondary side 104. For example, some other systems require an optical coupler or other circuit to form a feedback signal. However system 100 is devoid of such an optical coupler or other circuit on the secondary side that sends signals back to primary side 102.

Figure 11:
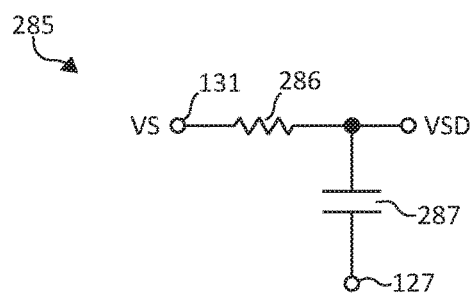
FIG. 11 schematically illustrates a portion of an example of an embodiment of a delay circuit that may be an alternate embodiment of a circuit of FIG. 5) in accordance with the present invention.

FIG. 11 schematically illustrates a portion of an example of an embodiment of a delay circuit 285 that may be an alternate embodiment of circuit 242 (FIG. 5). Circuit 285 includes a resistor 286 and a capacitor 287 that form an analog RC delay circuit. A first terminal of resistor 286 is connected to receive signal 131. A second terminal of resistor 286 is commonly connected to a first terminal of capacitor 287 and to an output to form the VSD signal. A second terminal of capacitor 287 is connected to common return 127.

In order to facilitate the hereinbefore described functionality, and referring to FIG. 1, and input of buffer 133 is connected to receive the AX signal from resistor 114. An output of buffer 133 is connected to an input of circuit 135. An output of circuit 135 is configured to form signal 136 and connected to an inverting input of circuit 139. A non-inverting input of circuit 139 is connected to receive a reference voltage from Ref 137. An output of amplifier 139 is connected to an inverting input of comparator 141 which has a non-inverting input connected to receive CS signal 122. An output of comparator 141 is connected to a reset input of latch 142. A set input of latch 142 is connected to receive a clock signal from clock circuit 144. A Q output of latch 142 may be configured to form signal 124 which may be connected to a gate of transistor 120. A Qbar output of latch 142 may be configured to form signal 143 and may be connected to another input of circuit 135. Circuit 144 may have another output configured to form a timing signal wherein the output is connected to an input of control circuit 145. An output of control circuit 145 may be connected to an input of circuit 135.

Referring to FIG. 4, a first input of circuit 230 may be commonly connected to a first input of circuit 231, a first input of circuit 233, a first input of circuit 235, and connected to receive signal 131. A second input of circuit 233 may be connected to receive a control signal from circuit 145. A third input of circuit 233 may be commonly connected to a second input of circuit 231 and connected to receive signal 143. An output of circuit 231 may be configured to form signal 232 and connected to a second input of circuit 235. An output of circuit 233 may be configured to form signal 234 is connected to a third input of circuit 235. An output of circuit 235 may be configured to form signal 136.

Referring to FIG. 5, an input of circuit 242 may be commonly connected to a first terminal of offset circuit 244 and configured to receive signal 131. An output of circuit 242 may be configured to form the VSD signal and connected to a non-inverting input of comparator 243. An inverting input of comparator 243 may be connected to the second terminal of circuit 244. An output of comparator 243 may be connected to a reset input of latch 246. A set input of latch 246 is connected to receive signal 143. A Q output of latch 246 is configured to form signal 232.

Referring to FIG. 7, an input of circuit 252 is commonly connected to receive signal 131, connected to a first terminal of switch 253, and connected to a non-inverting input of comparator 256. An inverting input of comparator 256 is connected to a first terminal offset circuit 255. A second terminal of circuit 255 is commonly connected to a first terminal of capacitor 254 and to a second terminal of switch 253. A second terminal of capacitor 254 is connected to return 127. An output of comparator 256 is connected to a reset input of latch 259. A set input of latch 259 is connected to receive signal 143. A Q output of latch 259 is configured to form signal 234.

Referring to FIG. 9, a first input of gate 272 is connected to receive signal 232 and a second input of gate 272 is connected to receive signal 234. An output of gate 272 is commonly connected to an input of circuit 274, and a control terminal of switch 276. A first terminal of switch 276 is connected to receive signal 131. A second terminal of switch 276 is commonly connected to a first terminal of capacitor 277 and a first terminal of switch 278. A second terminal of switch 278 is commonly connected to form signal 136 and to a first terminal of capacitor 280. A second terminal of capacitor 280 is commonly connected to a second terminal of capacitor 277 and to return 127. An output of circuit 274 is configured to form signal 275 is connected to a control input of switch 278.

Figure 12:
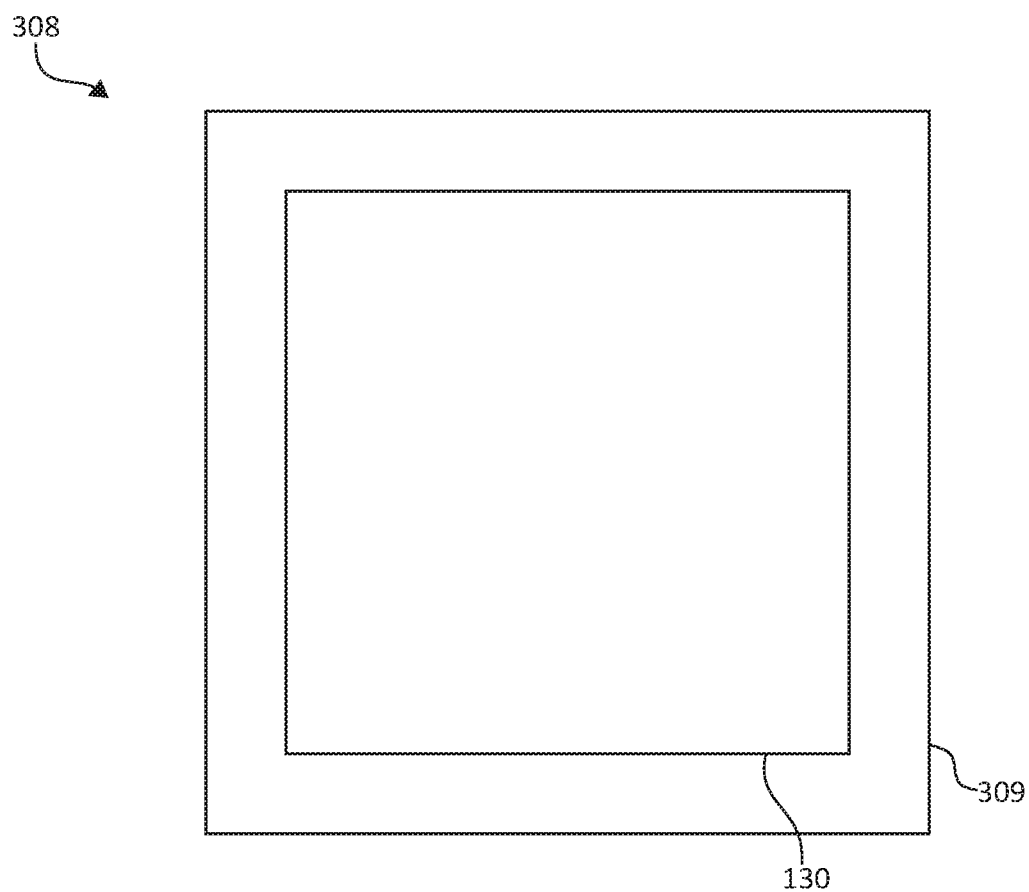
FIG. 12 illustrates an enlarged plan view of a semiconductor device that includes one or more of the circuits of FIG. 1, 4, 5, 7, or 9 in accordance with the present invention.

FIG. 12 illustrates an enlarged plan view of a portion of an embodiment of a semiconductor device or integrated circuit 308 that is formed on a semiconductor die 309. In an embodiment, any one of circuits 130, 135, 230, 240, 252, or 270 may be formed on die 309. Die 309 may also include other circuits that are not shown in FIG. 12 for simplicity of the drawing. The circuits or integrated circuit 308 may be formed on die 309 by semiconductor manufacturing techniques that are well known to those skilled in the art.

From all the foregoing, one skilled in the art will appreciate that an example of an embodiment of a power supply controller may comprise:

a PWM circuit, such as for example circuit 140, configured to control a power switch, such as for example transistor 120, to control a primary current, such as for example current 123, through a primary inductor of a transformer to regulate an output voltage, such as for example voltage Vo, formed from a secondary winding of the transformer wherein the secondary winding is configured to be coupled to a synchronous rectifier, such as for example transistor 105;

a first circuit configured to form a sense signal, such as for example signal 131, that is representative of an auxiliary voltage, such as for example signal AX, from an auxiliary winding of the transformer wherein the sense signal is representative of a value of the output voltage for at least a portion of an off-time of the power switch;

a first detection circuit, such as for example circuit 252, configured to delay a first time interval, such as for example interval 263, after a turn-off of the power switch and thereafter detect an increase of the sense signal, such as for example 215, prior to a subsequent turn-on of the power switch;

a sampling circuit, such as for example circuit 270, configured to store the sense signal as a feedback signal responsively to detecting the increase of the sense signal; and the PWM circuit configured to adjust an on-time of the power switch responsively to the feedback signal.

Another embodiment may include that the sampling circuit may be configured to store a first value of the sense signal, as a stored value, during at least the first time interval and thereafter to compare the sense signal to the stored value.

In another embodiment, the first detection circuit may include a first switch, such as for example switch 253 configured to receive the sense signal and store it on a capacitor, such as for example capacitor 254, during the first time interval as the stored value, a comparator, such as for example capacitor 256, configured to compare the sense signal to an offset value, such as for example offset 255, of the stored value.

An embodiment may include that the comparator may have a non-inverting input coupled to receive the sense signal and an inverting input coupled to a first terminal of an offset circuit, the first switch having a first terminal coupled to receive the sense signal and a second terminal commonly coupled to a first terminal of the capacitor and to a second terminal of the offset circuit.

In another embodiment, the first detection circuit may be configured to form the first time interval responsively to disabling the power switch.

An embodiment may also include a second detection circuit, such as for example circuit 240 configured to detect a decrease of the sense signal after turning-off the power switch and prior to a subsequent turn-on, such as for example a time T3, of the power switch.

In an embodiment, the sampling circuit may be configured to store the sense signal as the feedback signal responsively to either detecting the increase of the sense signal or detecting the decrease of the sense signal.

Another embodiment may also include that the sampling circuit may be configured to also store the sense signal as the feedback signal responsively to detecting the decrease of the sense signal.

An embodiment of the second detection circuit may include a delay circuit, such as for example circuit 242, configured to receive the sense signal and delay it a second time interval time interval as a delayed value, a comparator, such as for example comparator 243, configured to compare the delayed value to an offset value, such as for example signal VS1, of the sense signal.

Those skilled in the art will also appreciate that a method of forming a power supply controller may comprise:

configuring a switching controller, such as for example circuit 130, to form a switching control signal, such as for example signal 124, suitable to control a power switch, such as for example transistor 120, to control current, such as for example current 123, through a primary inductor of a transformer to regulate an output voltage, such as for example voltage Vo), formed from a secondary winding of the transformer wherein the secondary winding is coupled to a synchronous rectifier, such as for example transistor 105;

configuring the power supply controller to form a sense signal, such as for example signal 131, that is representative of an auxiliary voltage from an auxiliary winding of the transformer;

configuring the switching controller to determine an early turn-off of the synchronous rectifier before a current through the synchronous rectifier becomes substantially zero;

configuring the switching controller to form a feedback signal, such as for example signal FB, that is representative of a value of the output voltage by sampling a value of the sense signal responsively to either of the early turn-off of the synchronous rectifier or a zero crossing of the current through the synchronous rectifier; and configuring the switching controller to adjust an on-time of the power switch responsively to a value of the feedback signal.

The method may also have an embodiment that may include forming a first detection circuit, such as for example circuit 252, to store a value of the sense signal responsively to disabling the power switch and to detect the sense signal having a value that is greater than the stored value.

An embodiment may also include configuring the first detection circuit to add an offset value to the stored value to form an offset sense signal, such as for example signal 257.

Another embodiment may include configuring the first detection circuit compare the sense signal to the offset sense signal.

An embodiment of the method may include configuring the first detection circuit to enable a first switch, such as for example switch 253, to store the sense signal for a first time interval responsively to disabling the power switch.

Another embodiment may include forming a second detection circuit to form a delayed value of the sense signal and an offset value of the sense signal, including configuring the second detection circuit to detect the offset value decreasing to less than the delayed value.

Those skilled in the art will also appreciate that a method of forming a semiconductor device having a control circuit may comprise:

configuring a PWM circuit to control a power switch, such as for example a switch 120, to regulate an output voltage, such as for example voltage Vo, formed from a secondary winding of a transformer wherein the secondary winding;

configuring a first circuit to form a sense signal that is representative of a signal from an auxiliary winding of the transformer;

configuring a feedback circuit, such as for example circuit 270, to allow the sense signal to increase in response to a turn-off of the power switch, to subsequently detect a second increase of the sense signal prior to subsequently turning on the power switch, and to form a feedback signal as a value of the sense signal responsively to the second increase of the sense signal; and configuring the PWM circuit to adjust an on-time of a subsequent enabling of the power switch according to a value of the feedback signal.

An embodiment of the method may also include configuring a first detection circuit to sample the sense signal to form a sampled value responsively to disabling the power switch and to detect the sense signal increasing to greater than the sampled value.

In an embodiment, the method may include sampling the sense signal for a first time interval responsively to disabling the power switch and subsequently detecting the sense signal increasing to greater than the sampled value.

An embodiment may include configuring the feedback circuit to form the feedback signal responsively to the second increase of the sense signal or responsively to detecting a decrease of the sense signal.

The method may also have an embodiment that may include configuring a detection circuit to detect a decrease of the sense signal subsequently to disabling the power switch.

In view of all of the above, it is evident that a novel device and method is disclosed. Included, among other features, is forming a circuit to detect the sense signal increasing in value at a time interval subsequent to the disabling of the power switch. The detection is used to form a feedback signal that is representative of the output voltage. Using this signal to assist in forming the feedback signal, in addition to the detection of the current becoming substantially zero, improves the accuracy of the feedback signal that is formed. The improved accuracy improves the regulation of the output voltage.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of circuit 135 and circuits 240 and 252 are used as a vehicle to explain the operation method of detecting multiple points of the sense signal and using these points of the sense signal to form the feedback signal. The circuits may have other configurations as long as they allow the sense signal to increase in response to disabling the power switch and subsequently detect the sense signal decreasing in value or increasing in value while the power switch remains disabled, and to use these points to form the feedback signal from the value of the sense signal.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply circuit having a control circuit comprising:

configuring a PWM circuit of the control circuit to control a power switch to regulate an output voltage formed from a secondary winding of a transformer wherein the secondary winding is configured to be coupled to a synchronous rectifier;

a feedback circuit configured to receive a sense signal from an auxiliary winding of the transformer, the feedback circuit configured to allow the sense signal to increase in response to a turn-off of the power switch, to subsequently detect a second increase of the sense signal that occurs in response to a turn-off of the synchronous rectifier, and to form a feedback signal as a value of the sense signal responsively to detecting the second increase of the sense signal; and the control circuit configured to adjust an on-time of a subsequent enabling of the power switch according to a value of the feedback signal.

2. The power supply circuit of claim 1 wherein the feedback circuit includes a sampling circuit configured to store a first value of the sense signal responsively to detecting the second increase of the sense signal.

3. The power supply circuit of claim 2 further including a first detection circuit configured to store a value of the sense signal responsively to disabling the power switch and to detect the sense signal having a value greater than a stored value for detecting the second increase of the sense signal.

4. The power supply circuit of claim 3 wherein the first detection circuit includes a first switch configured to couple the sense signal to a capacitor in order to store the value of the sense signal.

5. The power supply circuit of claim 3 wherein the first detection circuit adds an offset value to the stored value to form an offset sense signal.

6. The power supply circuit of claim 5 wherein the first detection circuit includes a comparator to compare the sense signal to the offset sense signal.

7. The power supply circuit of claim 2 wherein the sampling circuit is also configured to store the first value of the sense signal responsively to detecting a decrease of the sense signal.

8. The power supply circuit of claim 7 wherein the sampling circuit includes a detection circuit having a delay circuit that receives the sense signal and forms a delayed signal, and a comparator that compares the delayed signal to an offset value of the sense signal.

9. A method of forming a power supply controller comprising:

configuring a first circuit to control a power switch to regulate an output voltage formed from a secondary winding of a transformer wherein the secondary winding is configured to be coupled to a synchronous rectifier;

configuring a second circuit to receive a sense signal from an auxiliary winding of the transformer;

configuring a third circuit to store a value of the sense signal as a feedback signal responsively to detecting the synchronous rectifier turning off prior to a secondary current through the synchronous rectifier becoming substantially zero; and configuring the first circuit to adjust an on-time of a subsequent enabling of the power switch according to a value of the sense signal.

10. The method of claim 9 including configuring the third circuit to store the value of the sense signal as the feedback signal responsively to detecting the sense signal increasing from a first value to a second value wherein the second value occurs responsively to disabling the synchronous rectifier.

11. The method of claim 10 including configuring the third circuit to allow the sense signal to increase in response to disabling the power switch to form the first value and to subsequently detect the sense signal increasing to the second value.

12. The method of claim 10 including configuring the third circuit to sample the sense signal for a first time interval responsively to disabling the power switch to form a sampled value and subsequently detect the sense signal increasing to greater than the sampled value.

13. The method of claim 12 including configuring the third circuit to store the sense signal on a capacitor for the first time interval to form a stored value, to add an offset to the stored value to form an offset value, and to compare the offset value to the sense signal.

14. The method of claim 9 including configuring the third circuit to store the sense signal as the feedback signal responsively to detecting a decrease of the sense signal subsequently to disabling the power switch.

15. A method of forming a power supply circuit comprising:
configuring a PWM circuit to control a power switch to regulate an output voltage formed from a secondary winding of a transformer wherein the secondary winding is configured to be coupled to a synchronous rectifier;
configuring a feedback circuit to receive a sense signal from an auxiliary winding of the transformer and to detect a turn-off of the synchronous rectifier; and
configuring the feedback circuit to form a feedback signal as a value of the sense signal responsively to detecting the turn-off of the synchronous rectifier.

16. The method of claim 15 including configuring the PWM circuit to adjust an on-time of a subsequent enabling of the power switch according to a value of the feedback signal.

17. The method of claim 15 including configuring the feedback circuit to form the feedback signal as a value of the sense signal responsively to detecting a substantially zero crossing of a secondary current from the secondary winding.

18. The method of claim 17 further including configuring a detection circuit to receive the sense signal and delay the sense signal to form a delayed signal, and configuring the detection circuit to compare the delayed signal to the sense signal added to an offset signal.

19. The method of claim 15 wherein configuring the feedback circuit to detect the turn-off of the synchronous rectifier includes configuring a detection circuit to detect the synchronous rectifier turning-off prior to a substantially zero value of a current through the synchronous rectifier.

20. The method of claim 19 including configuring the feedback circuit to delay a time interval after disabling the power switch and subsequently detect an increase of the sense signal for detecting the turn-off of the synchronous rectifier.

\* \* \* \* \*